United States Patent
Chub et al.

(10) Patent No.: US 12,060,174 B2
(45) Date of Patent: Aug. 13, 2024

(54) STORAGE CASE, WITH PLATFORM, FOR AN AERIAL VEHICLE

(71) Applicant: Fotokite AG, Zürich (CH)

(72) Inventors: Victor Chub, Broomfield, CO (US); Alex Lieber, Boulder, CO (US); Sergei Lupashin, Zürich (CH); Christopher McCall, Zürich (CH); Milan Rohrer, Zürich (CH); Lukas Scherrer, Zürich (CH); Alexander Zhitelzeyf, Brooklyn, NY (US)

(73) Assignee: FOTOKITE AG, Zurich (CH)

( * ) Notice: Subject to any disclaimer, the term of this patent is extended or adjusted under 35 U.S.C. 154(b) by 0 days.

(21) Appl. No.: 17/999,126

(22) PCT Filed: May 10, 2021

(86) PCT No.: PCT/IB2021/053939
§ 371 (c)(1),
(2) Date: Nov. 17, 2022

(87) PCT Pub. No.: WO2021/234502
PCT Pub. Date: Nov. 25, 2021

(65) Prior Publication Data
US 2023/0202692 A1    Jun. 29, 2023

Related U.S. Application Data

(60) Provisional application No. 63/026,807, filed on May 19, 2020.

(51) Int. Cl.
*B64U 80/70* (2023.01)
*B64C 39/02* (2023.01)
(Continued)

(52) U.S. Cl.
CPC ............ *B64U 80/70* (2023.01); *B64C 39/022* (2013.01); *B64F 1/222* (2013.01); *B64U 10/16* (2023.01);
(Continued)

(58) Field of Classification Search
CPC ........ B64U 80/70; B64U 10/16; B64U 10/60; B64U 70/93; B64U 80/86; B64U 80/84;
(Continued)

(56) References Cited

U.S. PATENT DOCUMENTS

2013/0061738 A1* 3/2013 Stevenson ............... F42B 12/44
                                                          89/1.51
2016/0229299 A1* 8/2016 Streett ..................... B60L 53/12
(Continued)

OTHER PUBLICATIONS

Canright, Shelley, and Brian Dunbar. "Infrared Light." NASA, Mar. 18, 2004, https://web.archive.org/web/20040417150321/www.nasa.gov/audience/forstudents/5-8/features/F_Infrared_Light_5-8.html (Year: 2004).*

(Continued)

*Primary Examiner* — Richard Green
*Assistant Examiner* — Steven J Shur
(74) *Attorney, Agent, or Firm* — Pearne & Gordon LLP

(57) ABSTRACT

A storage case, including, at least one door which is moveable between a first position in which the door is closed and a second position in which the door is opened; a platform, which can support an aerial vehicle; and a mechanical connection means which is connected between the platform and the at least one door, wherein the mechanical connection means is configured such that as the door is moved from its first position to its second position the platform is simultaneously elevated; and as the door is moved from its second position to its first position the platform is simultaneously lowered; and a controller configured to control the mechanical connection means. There is further provided a corre- (Continued)

Figure 1A:
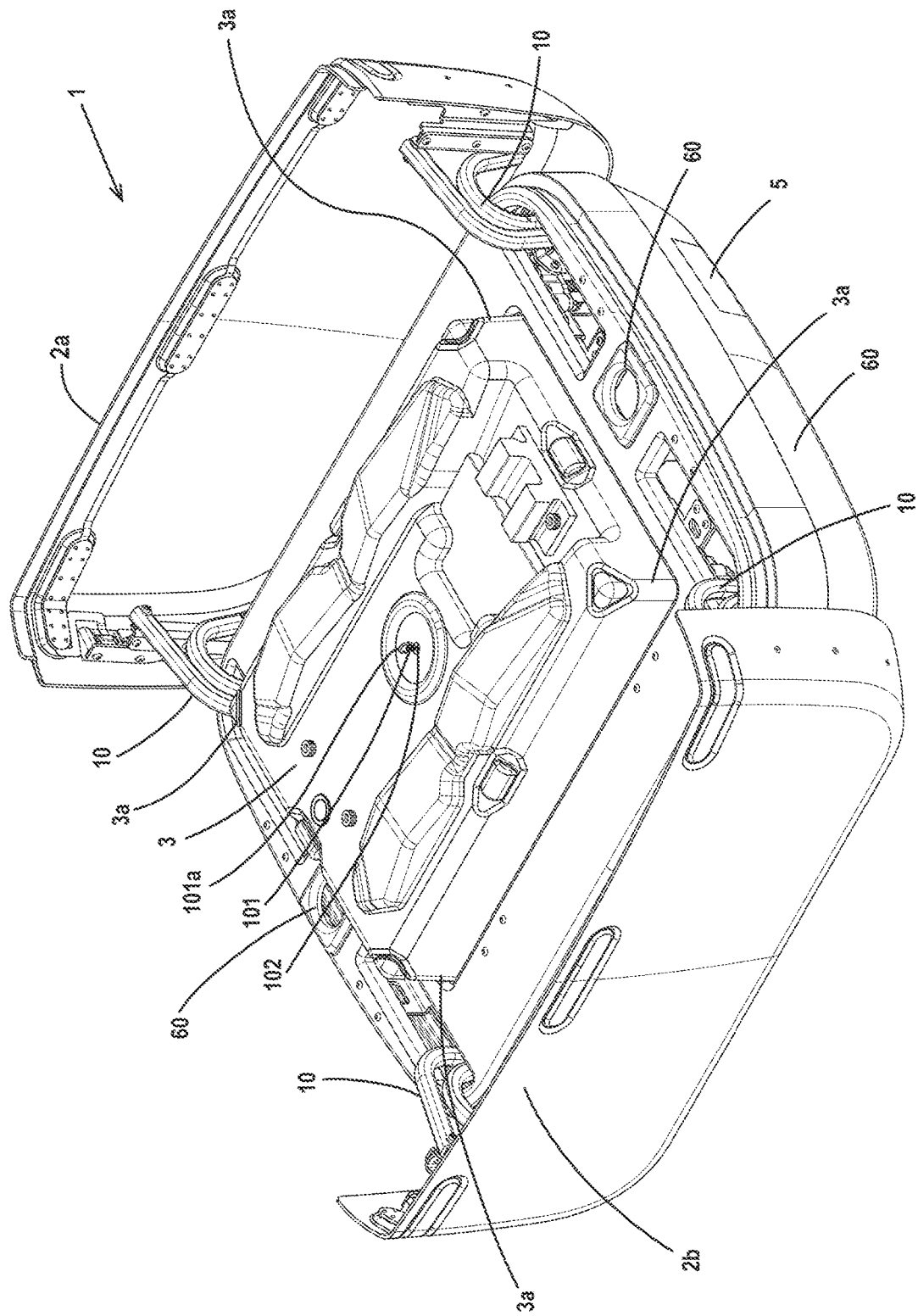

sponding method of deploying an aerial vehicle; a corresponding method of storing an aerial vehicle; an assembly including the storage case and an aerial vehicle; and a vehicle including the storage case.

39 Claims, 8 Drawing Sheets

(51) Int. Cl.
*B64F 1/222* (2024.01)
*B64U 10/16* (2023.01)
*B64U 10/60* (2023.01)
*B64U 70/93* (2023.01)
*B64U 80/86* (2023.01)

(52) U.S. Cl.
CPC ............. *B64U 10/60* (2023.01); *B64U 70/93* (2023.01); *B64U 80/86* (2023.01)

(58) Field of Classification Search
CPC .. B64U 2201/202; B64C 39/022; B64F 1/222
See application file for complete search history.

(56) References Cited

U.S. PATENT DOCUMENTS

| | | | |
|---|---|---|---|
| 2017/0158353 A1* | 6/2017 | Schmick | B60L 53/12 |
| 2018/0245365 A1* | 8/2018 | Wankewycz | B64U 70/95 |
| 2019/0308724 A1* | 10/2019 | Cooper | B64C 39/024 |
| 2019/0383052 A1 | 12/2019 | Blake et al. | |
| 2021/0031947 A1* | 2/2021 | Wankewycz | B60L 50/60 |

OTHER PUBLICATIONS

International Search Report issued in Application No. PCT/IB2021/053939 dated Sep. 6, 2021.
Written Opinion for Application No. PCT/IB2021/053939 dated Sep. 6, 2021.

* cited by examiner

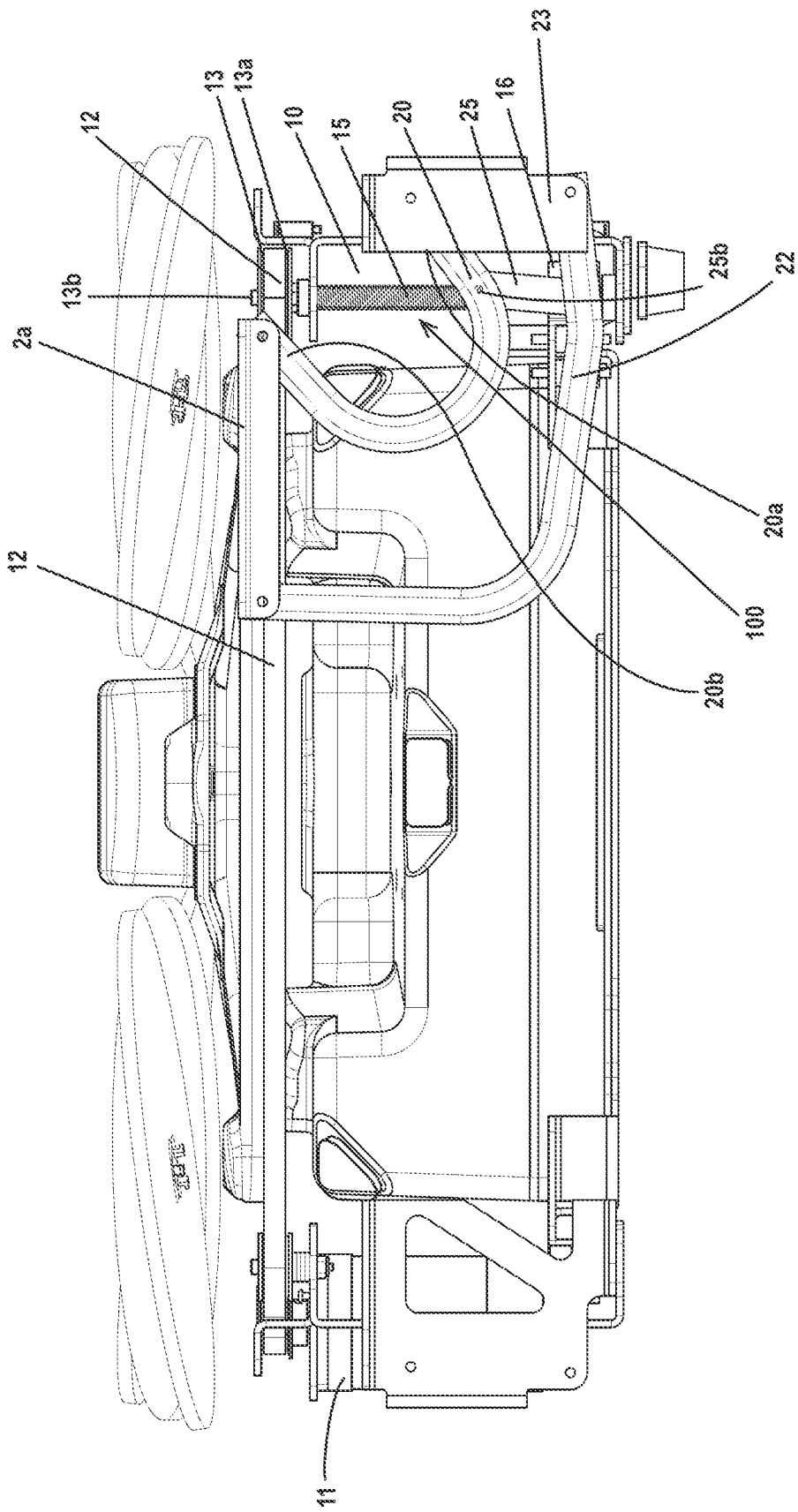

STORAGE CASE, WITH PLATFORM, FOR AN AERIAL VEHICLE

RELATED APPLICATION

This application is a national phase of PCT/IB2021/053939 filed on May 10, 2021, which claims the priority of U.S. provisional Application No. 63/026,807, filed on May 19, 2020. The entire contents of these applications are hereby incorporated by reference in their entireties.

FIELD OF THE INVENTION

The present invention concerns a storage case, with a platform, for an aerial vehicle; and in particular a storage case in which the platform (which serves as both a landing platform and a launch platform for the vehicle) raises as the case is opened (and lowers as the case is closed). There is further provided a corresponding method of deploying an aerial vehicle; a corresponding method of storing an aerial vehicle; an assembly which comprises the storage case; and a vehicle, or structure, which comprises the storage case.

BACKGROUND

Unmanned aerial vehicles are typically stored in storage cases for protection; in use a user needs to manually remove the vehicle from the storage case, and manually carry the vehicle to an open spacious area away from the storage case so that the vehicle has sufficient room to launch. Likewise, when landing, the user typically will land the vehicle in an open spacious area away from the case and will then manually carry the vehicle into the storage case for storage.

Moreover, in some applications the storage case for an aerial vehicle is in a fixed location which is not easy for the user to reach (for example the storage case may be mounted on the roof of a vehicle such as a fire truck or SUV); this makes it more difficult for the user to manually remove the vehicle from the storage case for deployment and to manually replace the vehicle into the storage case after landing for storage.

With existing solutions it is not possible to safely launch vehicles directly from their storage case. Likewise, with existing solutions it is not possible to safely land vehicles directly into their storage case. This is because there is insufficient clearance between the vehicle and storage case to allow for safe landing and deployment.

On the other hand an increase to the size of the case so as to allow for more clearance between the vehicle and storage case is not a desirable solution as increasing the size of the storage case has the undesirable effect of increasing the foot-print of the storage case; a storage case with larger foot-print cannot be used in areas where there is restricted spaced.

It is an objective of the present invention to mitigate at least some of the disadvantages associated with existing solutions in the art.

SUMMARY OF THE INVENTION

According to the present invention this objective is achieved at least by means of a storage case for an aerial vehicle, having the features recited in claim 1.

In the present invention the platform of the storage case serves both as a landing platform and also as a launch platform for the aerial vehicle. Advantageously, since the platform of the storage raises as the doors of the storage case are opened, this provides for an increase in the clearance between the vehicle and the storage case; the increase in clearance is sufficient to enable the vehicle to be launched directly from the platform of the storage case, and also enables the vehicle to be landed directly onto the platform of the storage case, without the user having to manually move the vehicle away from the case for launching or manually move the vehicle onto the platform for storage. Importantly, in the present invention the increase in clearance is achieved without having to increase the foot-print of the storage case.

The present invention further provides a corresponding method of deploying an aerial vehicle; a corresponding method of storing an aerial vehicle; an assembly which comprises the storage case and an aerial vehicle; and a vehicle which comprises the storage case.

The dependent claims recite optional features of preferred embodiments.

SHORT DESCRIPTION OF THE DRAWINGS

Figure 1B:
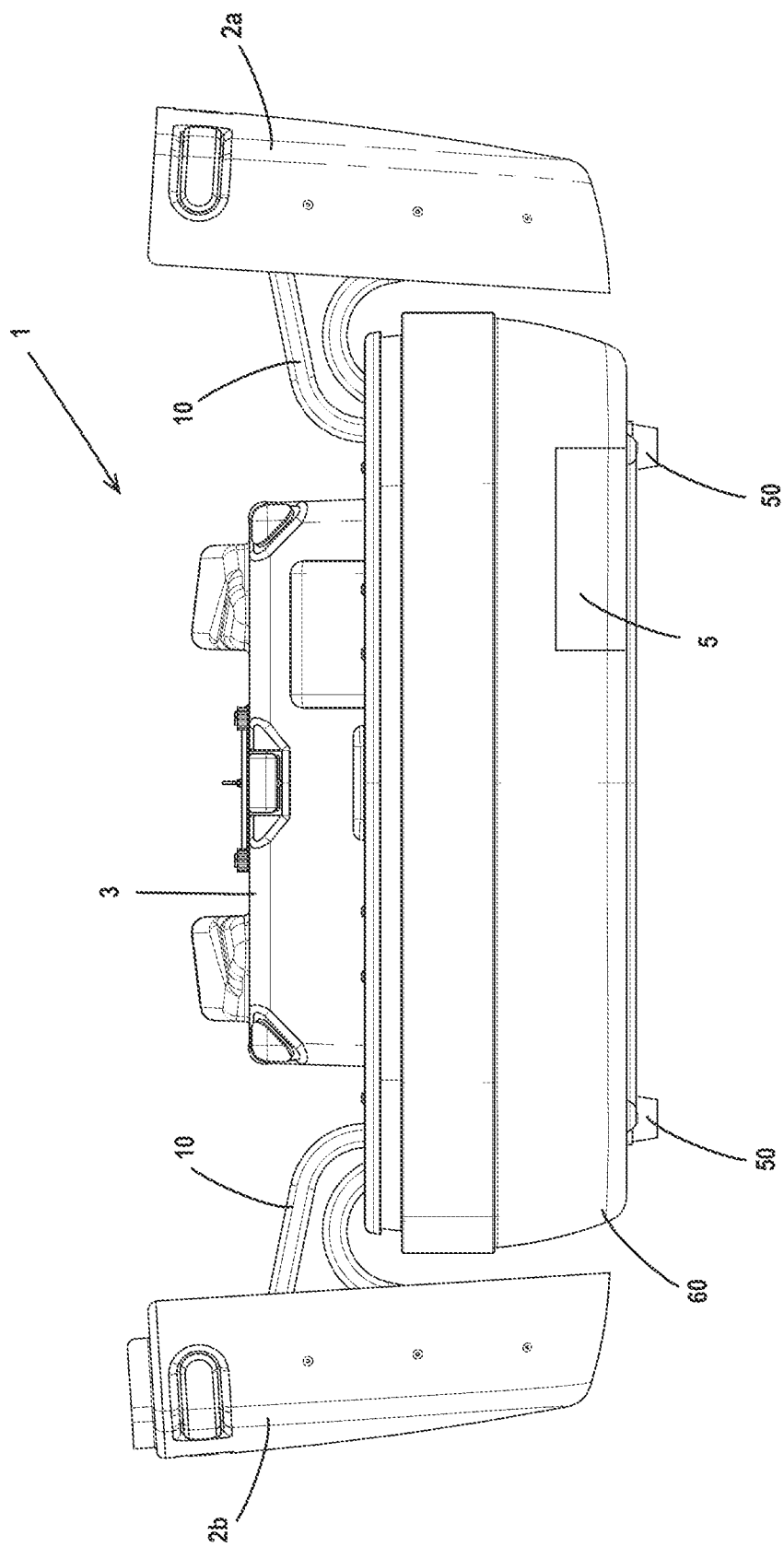
Figure 2:
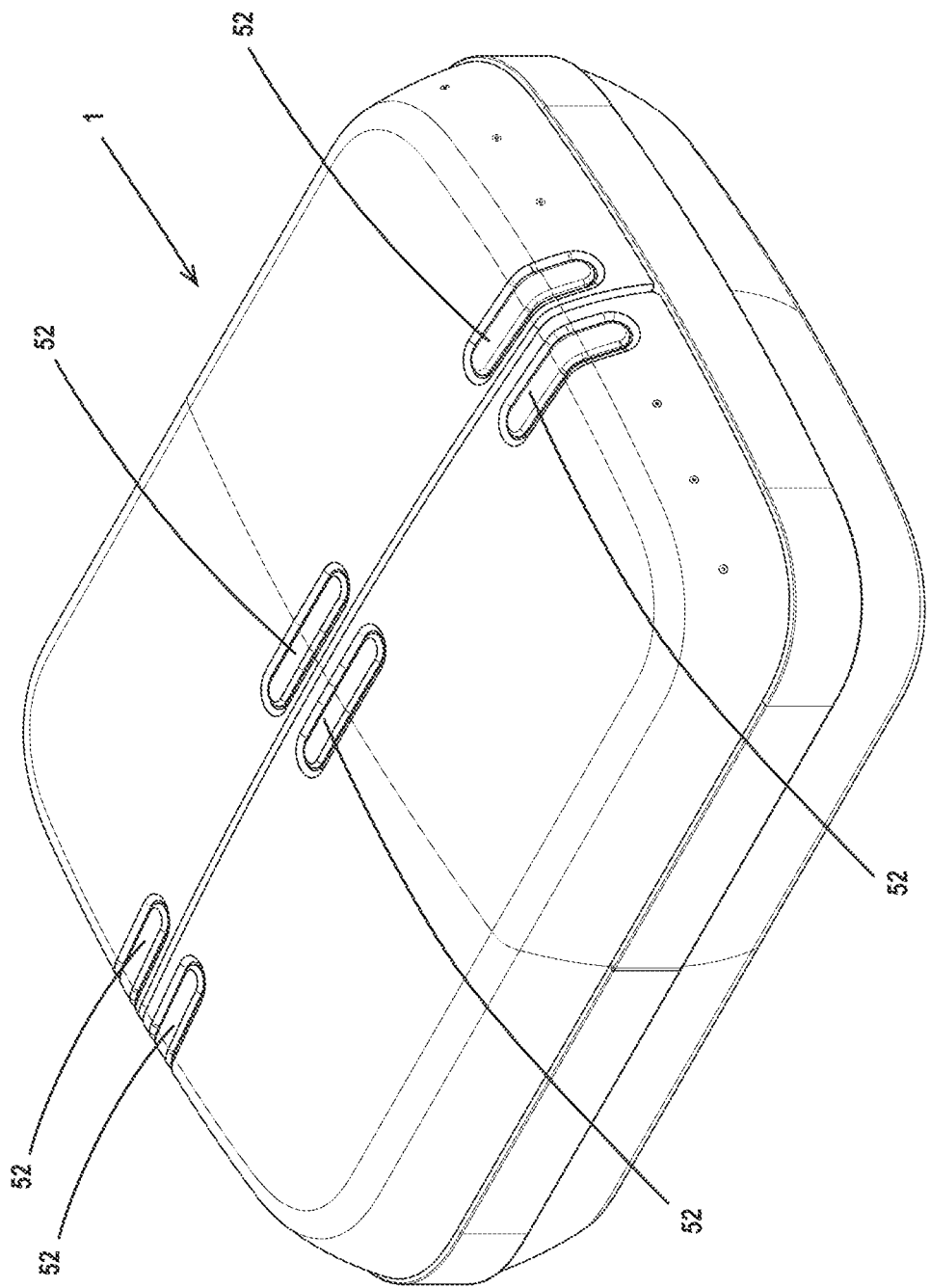
Figure 3:
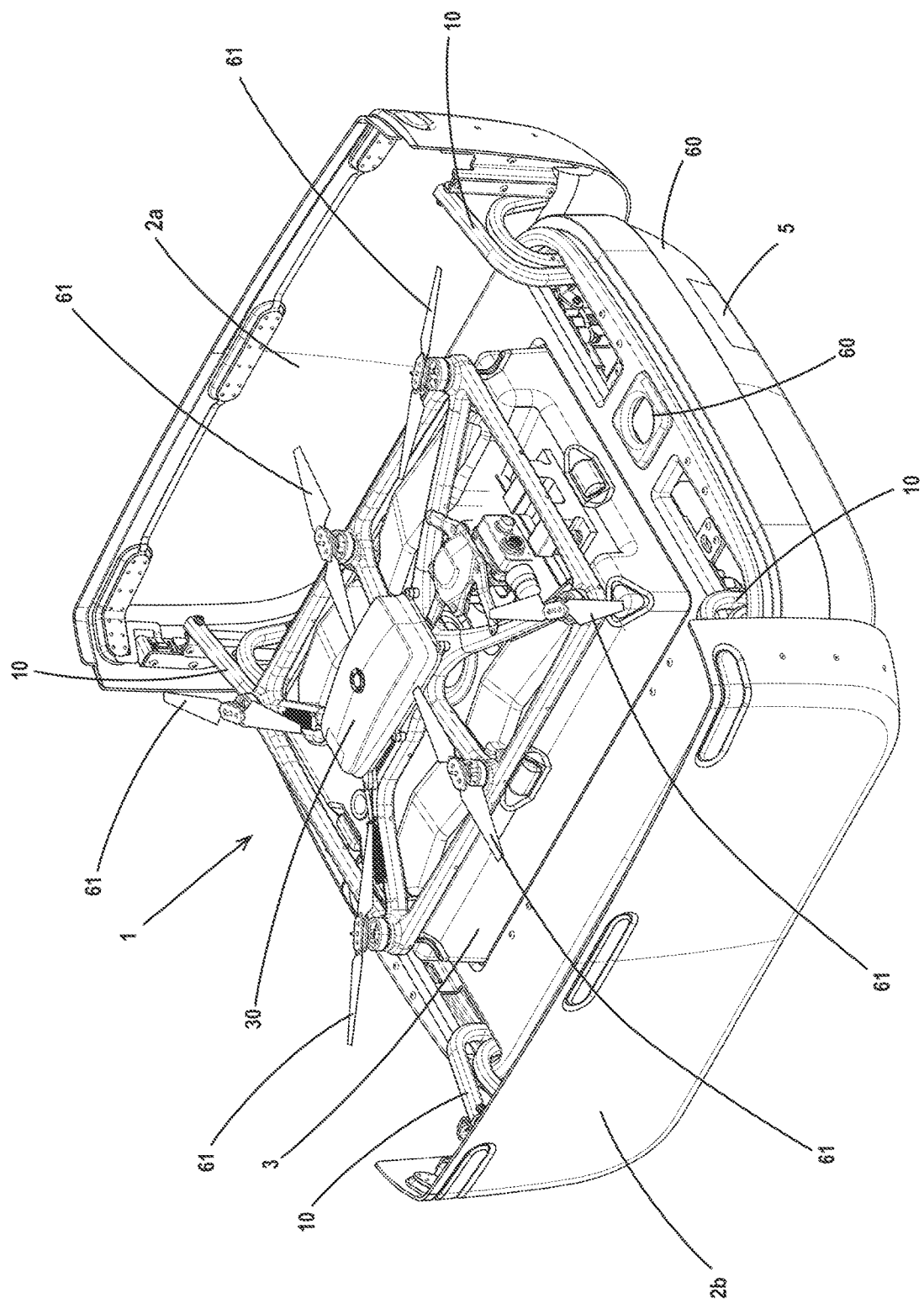
Figure 4B:
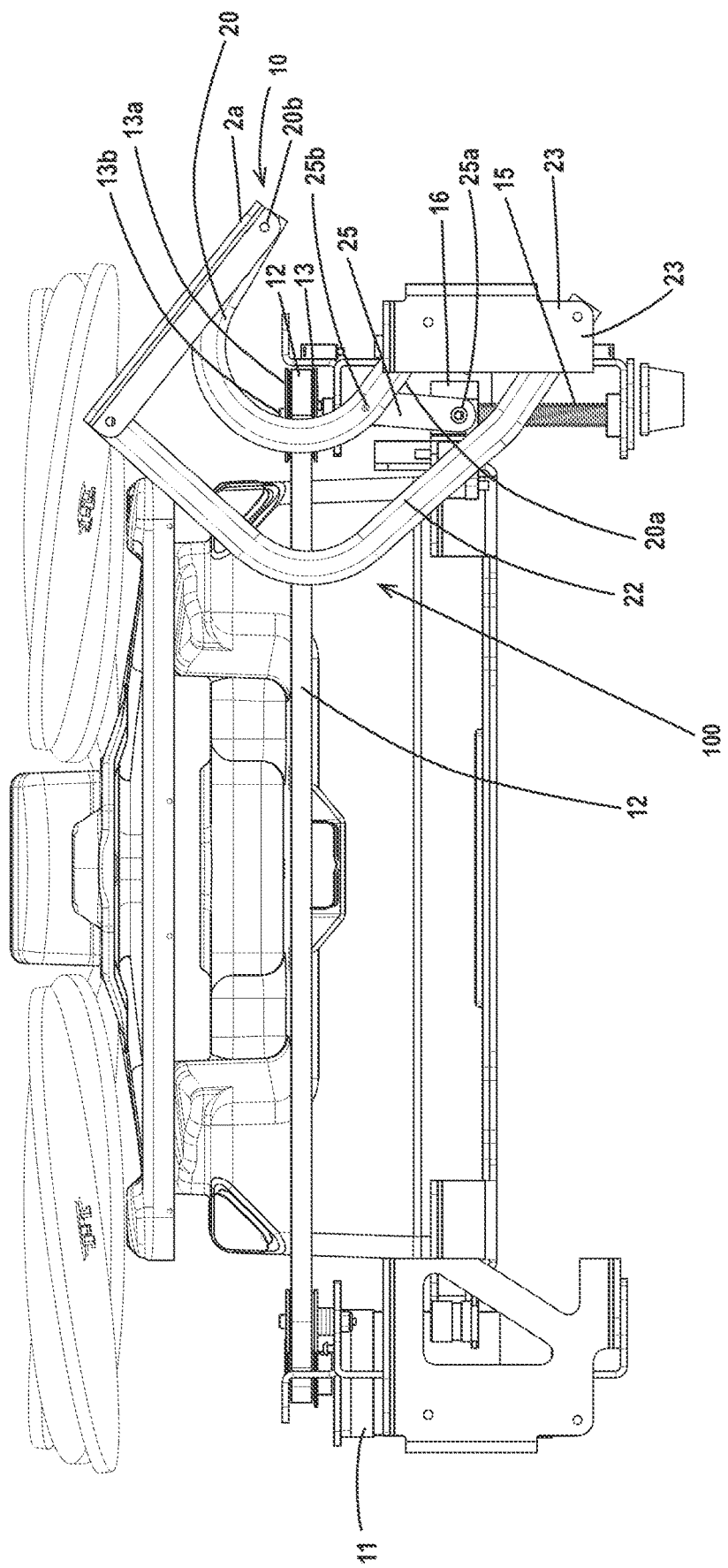
Figure 4C:
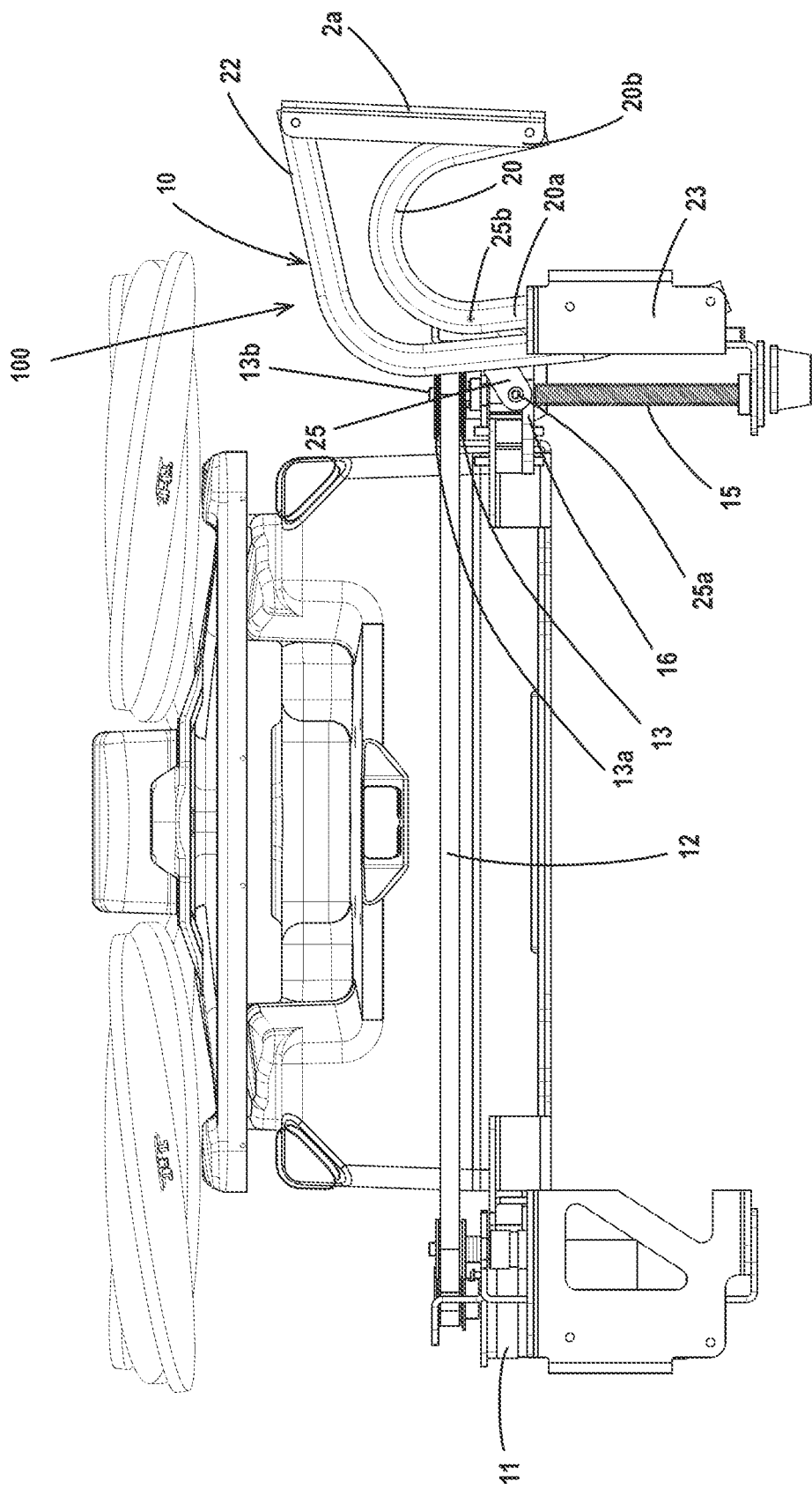
Figure 5:
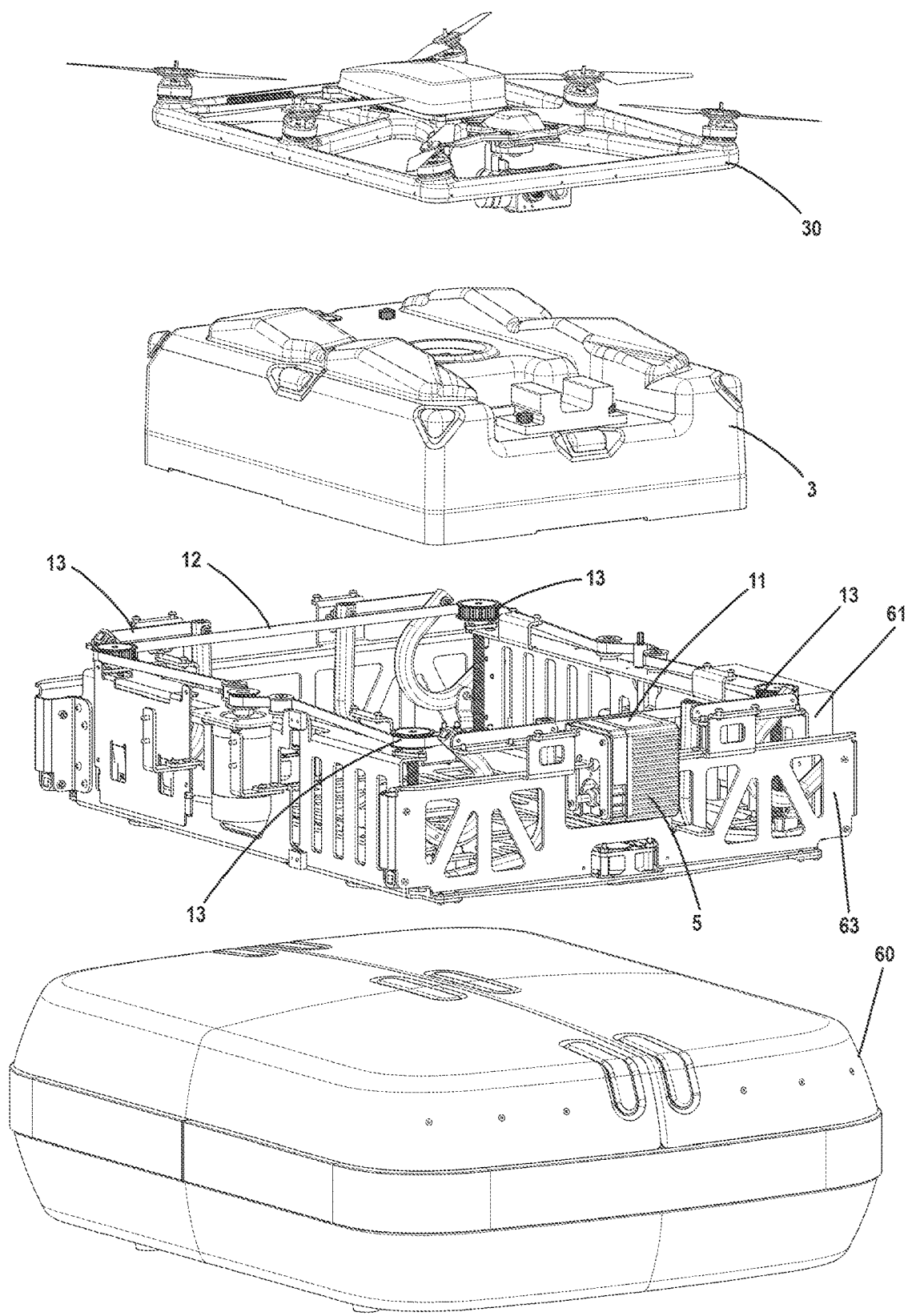

Embodiments of the present invention will be described by way of example only, with reference to the following figures, in which:

FIG. 1a provides a perspective view of a storage case according to one embodiment of the present invention, when the doors of the storage case are open;

FIG. 1b provides a side view of a storage case of FIG. 1a;

FIG. 2 provides a perspective view of a storage case according to one embodiment of the present invention, when the doors of the storage case are closed;

FIG. 3 provides a perspective view of a storage case according to one embodiment of the present invention, with an aerial vehicle parked on the platform of the storage case (FIG. 3 is a perspective view of an assembly according to an embodiment of the present invention);

FIGS. 4a-c provide cross-section views of the storage case 1 showing a side view of part of the mechanical connection means, with the features of only one of the actuating modules shown in detail (for clarity purposes);

FIG. 5 provides an exploded view of the storage case of FIG. 3.

DETAILED DESCRIPTION OF THE DRAWINGS

FIG. 1 shows a storage case 1 according to the present invention. The storage case 1 comprises, at least one door 2a,2b which is moveable between a first position in which the door is closed and a second position in which the door is opened; in this embodiment the storage case 1 comprises a first door 2a which opens outwards in a first direction and a second door 2b which opens outwards in a second direction, wherein the second direction is opposite to the first direction. FIG. 1a shows a perspective view of storage case 1 when the doors 2a,2b are in their second position (i.e. when the doors 2a,2b are open); and FIG. 2 shows a perspective view of storage case 1 when the doors 2a,2b are in their first position (i.e. when the doors 2a,2b are closed).

The storage case 1 comprises a platform 3, which can support an aerial vehicle. FIG. 3 shows the storage case 1 with an aerial vehicle 30 supported on the platform 3.

The storage case 1 further comprises a mechanical connection means 10 which is connected between the platform 3 and the first and second doors 2a,2b. The mechanical connection means 10 is configured such that the platform 3 moves simultaneously with the doors 2a,2b; specifically the mechanical connection means 10 is configured such as the first and second doors 2a,2b are moved from their respective first positions to their respective second positions the platform 3 is simultaneously elevated; and is configured such that as the first and second doors 2a,2b are moved from their respective second positions to their respective first positions the platform 10 is simultaneously lowered.

The storage case 1 further comprises a controller 5 which is configured to control mechanical connection means 10; by controlling the mechanical connection means 10 the controller thereby controls the movement of the doors 2a,2b and the platform 3.

FIGS. 4a-c is a cross-section views of the storage case 1 showing a side view of part of the mechanical connection means 10 which is used in the storage case 1; however it should be understood that the mechanical connection means 10 may take any suitable form. Specifically, in this embodiment the mechanical connection mean 10 comprises a motor 11, a belt 12 and a plurality of actuating modules 100. The belt 12 cooperates with the motor 11 so that the motor, when operated, can move the belt 12; the belt 12 also cooperates with each of the actuating modules 100.

The number of actuating modules 100 provided in the storage case is preferably, equal to, or greater than, the number of doors in the storage case; in other words if the storage case 1 has two doors then the storage case 1 should preferably comprise at least two actuating modules 100. In this embodiment the storage case 1 comprises two doors 2a,2b and comprises four actuating module 100. Each actuating module 100 is located adjacent to a respective corner 3a (see FIG. 1b) of the platform 3. It should be noted however that FIGS. 4a-c only one single actuating module 100 in detail for clarity.

Referring FIGS. 4a-c the features of a single actuating module 100 will now be described; it should be understood that each of the four actuating modules 100 provided in the storage case 1 have the same features.

The actuating module shown in FIG. 4a-c comprises a pulley 13 which comprises a wheel 13a which can rotate about an axis 13b. The belt 12 cooperates with each of the actuating modules 100 by abutting the wheel 13a of the pulley 13 of each actuating module 100. For each actuating module 100, movement of the belt 12 in a first direction (e.g. clock-wise) by the motor 11 will cause the belt to rotate the wheel 13 of the pulley 13 to rotate in a first direction about its respective axis 13b, and movement of the belt 12 in a second direction (e.g. anticlock-wise) by the motor 11 will cause the belt to rotate the wheel 13 of the pulley 13 in a second direction, which is opposite to the first direction, about its respective axis 13b.

The pulley 3 is attached to a respective lead screw 15 in such a way that rotation of the wheel 13a of the pulley 13 will effect rotation of the respective lead screw 15 which is attached to the pulley 13. The lead screw 15 in turn cooperates with a runner 16 which is attached to the platform 3. When the lead screw 15 is rotated in a first direction (e.g. clock-wise) then the runner 16 which cooperates with that lead screw 15 moves up the lead screw 15 towards the pulley 13; when the lead screw 15 is rotated in a second direction (e.g. anticlock-wise) which is opposite to the first direction, then the runner 16 which cooperates with that lead screw 15 move down the lead screw 15 away from the pulley 13.

The runner 16 is pivotally attached via a link 25 to a primary arm member 20. The link 25 is, at one end, pivotally attached to the runner 16 via a first pivot connection 25a, and is, at an opposite end, pivotally attached to the primary arm member 20 via a second pivot connection 25b. In this embodiment the second pivot connection 25b is proximate to a first end 20a of the primary arm member 20. The primary arm member 20 is in turn pivotally attached to a door 2a,2b at the second, opposite end 20b of the primary arm member 20; in this particular single actuating module 100, which is being described, the primary arm member 20 is attached to the first door 2a. In this embodiment the primary arm members 20 of two of the four actuating modules 100 are pivotally attached to the first door 2a, and the primary arm members 20 of the other two of the four actuating modules 100 are pivotally attached to the second door 2b. Optionally, the primary arm member 20 is further pivotally attached to a fixed member 23; in this embodiment the first end 20a of the primary arm member 20 is further pivotally attached to the fixed member 23. In the embodiment shown in FIGS. 4a-c the primary arm member 20 is substantially 'C' shaped; however, it should be understood that the primary arm member 20 may have any suitable shape.

The actuating module 100 further comprises a secondary arm member 22 which is, at one end thereof, pivotally attached to a door 2a,2b, and is, at an opposite end thereof, pivotally attached to the fixed member 23. In this particular single actuating module 100, which is being described, the secondary arm member 22 is attached to the first door 2a. In this embodiment the primary arm members 22 of two of the four actuating modules 100 are pivotally attached at one end thereof to the first door 2a, and the secondary arm members 22 of the other two of the four actuating modules 100 are pivotally attached at one end thereof to the second door 2b. In the embodiment shown in FIGS. 4a-c the secondary arm member 22 is substantially 'L' shaped; however, it should be understood that the secondary arm member 22 may have any suitable shape. It should be understood that the secondary arm member 22 is an optional feature.

During use, the controller 5 configured to control the motor 11; this in turn allows the controller to control the movement of the first and second doors 2a,2b and the platform 3. For example, if the doors 2a,2b of the storage case 1 are closed and an aerial vehicle 30 is stored on the platform 3 inside the storage case 1, then in order to launch the aerial vehicle 30 the doors 2a,2b of the storage case 1 must first be opened. To do this the controller 5 will first operate the motor 11 so that the motor 11 moves the belt 12 it the first direction; the movement of the belt 12 by the motor 11 in the first direction will in turn effect the rotation of the wheels 13 of each pulley 13 in each respective actuating module 100, in the first direction; in each respective actuating module 100 the rotation of the wheel 13a of the pulley 13 in turn causes the rotation of the lead screw 15 which is attached to the wheel 13a of that pulley 13 to rotate in the first direction; as the lead screw 15 rotates in the first direction the runner 16 which cooperates with that lead screw 15 move up the lead screw 15 towards the pulleys 13 of that actuating module 100. Since the runner 16 of each actuating module 100 is attached to the platform 3, as the runner 16 of each actuating module 1000 move, up towards the pulley 13 of that respective actuating module 100, the platform 3 is elevated; in other words as the runners 16 in each actuating module 100 move up towards the pulley 13 in that actuating module, the runners 16 carry the platform 3 to a higher position.

Also, since the runner 16 of each actuating module 100 is pivotally attached via a respective link 25 to a respective primary arm member 20; and since the primary arm members 20 of two of the four actuating modules 100 are pivotally attached to the first door 2a, and the primary arm members 20 of the other two of the four actuating modules 100 are pivotally attached to the second door 2b; as runners 16 move up towards the pulleys 13 the first and second doors 2a,2b will be moved from their first position in which the doors 2a,2b are closed, to their second position in which the doors 2a,2b are opened. Preferably when moving from their first position to their second position, the doors 2a,2b move up and simultaneously to the side; in other words the first door 2a moves simultaneously up and to the right when moving from its first position to its second position; and the second door 2b moves simultaneously up and to the left, when moving from its first position to its second position. This movement of the doors 2a,2b when opening enables to minimize the size of the foot-print of the storage case when the doors 2a,2b are opening.

Thus, the mechanical connection means 10 illustrated in FIGS. 4a-c enables opening of the doors 2a,2b and simultaneous elevation of the platform 3. Moving the platform 3 to an elevated position allows for an increase in the clearance between the aerial vehicle 30 which is to be launched from the platform 3 and the other parts of the storage case (in particular the doors 2a,2b); and this increase in clearance is achieved without have increased the foot-print of the storage case.

After the aerial vehicle 30 has landed on the platform 3, and is to be stored in the storage case 1, then the controller 5 will operate the motor 11 so that the motor 11 moves the belt 12 it the second direction (which is opposite to the first direction); the movement of the belt 12 by the motor 11 in the second direction will in turn effect the rotation of the wheels 13a of the pulley 13 in each actuating module 100, in the second direction. In each actuating module 100, the rotation of the wheels 13a in the second direction in turn causes the rotation of the lead screw 15 which is attached to the wheel 13a, in the second direction; as the lead screw 15 rotates in the second direction the runner 16 which cooperates with the lead screw 15 move down their respective lead screws 15 away from the pulley 13 of that actuating module 100. Since the runner 16 of each actuating module 100 is attached to the platform 3, as the runner 16 of each actuating module 1000 move up downwards away from the pulley 13, the platform 11 is lowered (from its previous elevated position); in other words as the runners 16 in each actuating module 100 move downwards away from the pulley 13 in that actuating module, the runners 16 carry the platform to a lower position.

Since the runner 16 of each actuating module 100 is pivotally attached via a respective link 25 to a respective primary arm member 20; and since the primary arm members 20 of two of the four actuating modules 100 are pivotally attached to the first door 2a, and the primary arm members 20 of the other two of the four actuating modules 100 are pivotally attached to the second door 2b; as runners 16 move downwards away from the pulleys 13 the first and second doors 2a,2b will be moved from their second position in which the doors are open, to their first position in which the doors are closed. Preferably when moving from their second position to their first position, the doors 2a,2b move down and simultaneously to the side; in other words the first door 2a moves simultaneously down and to the left when moving from its second position to its first position; and the second door 2b moves simultaneously down and to the right, when moving from its second position to its first position. This movement of the doors 2a,2b when closing enables to minimize the size of the foot-print of the storage case when the doors 2a,2b are closing.

In one embodiment the doors 2a,2b are configured to abut the aerial vehicle when the doors 2a,2b are in their first position, so that the doors 2a,2b prevent the aerial vehicle 30 from becoming displaced from its parked position on the platform 3.

In one embodiment the storage case 1 further comprises at least two limit switches each of which are operably connected to the controller 5. Each limit switch may be a physical switch or another type of detector such as a hall sensor-magnet arrangement. In the preferred embodiment, a first limit switch is located in a first position in the storage case 1; the first position is such that the platform 3 contacts the first limit switch only when the platform 3 is in its elevated position and the doors 2a,2b are in their second position (i.e the doors 2a,2b are open). When the platform 3 contacts the first limit switch the controller receives a first signal from that first limit switch indicating to the controller 5 that the doors 2a,2b have reached their second position and the platform 3 has been moved to its elevated position. In response to receiving the first signal from the first limit switch the controller 5 will stop the motor 11 for a time period so that the platform 3 is held in its elevated position and the doors 2a,2b are held in their open position as the aerial vehicle 30 is launched directly from the platform 3.

A second limit switch is located in a second position in the storage case 1; the second position is such that the platform 3 contacts the second limit switch only when the platform 3 is in its lowest position and the doors 2a,2b are in their first position (i.e the doors 2a,2b closed). When the platform 3 contacts the second limit switch the controller 5 receives a second signal from that second limit switch indicating to the controller 5 that the doors 2a,2b have reached their first position and that the platform 3 has been moved to its lowest position. In response to receiving the second signal from the second limit switch the controller 5 may stop the motor 11 so that the platform 3 is held in its lowered position and the doors 2a,2b are held in shut.

The storage case 1 may further comprise a torque sensor which is configured to measure the torque applied to the doors 2a,2b; the torque sensor is operably connected to the controller 5. The controller 5 may be configured to receive a torque measurement from the torque sensor and to compare the received torque measurement to a predefined threshold torque value. The controller 5 is further configured to stop the motor 11 if the torque measurement is greater than, or equal, to the predefined threshold torque value. This serves as a safety function, for example, in the event a body part of the user is positioned between the doors 2a,2b as the doors 2a,2b are closing (i.e. as the doors 2a,2b are moving from their second position to their first position); in this case, the motor 11 will drive the belt 12 so that the actuating modules 100 move the doors 2a,2b towards their first position, however the user's body part will prevent the doors 2a,2b from moving to their first position; as the user's body part is clamped between the closing doors 2a,2b, the torque sensor will measure an increase in torque applied to the doors 2a,2b; the torque will eventually increase to a level in which it is equal to, or greater, than the predefined threshold torque, and the controller 5 will stop the motor 11 thus preventing injury of the user's body.

Referring to FIG. 1a, it is shown that in this embodiment the storage case 1 further comprises a spool and a tether 101 (the tether 101 can be wound around the spool); the spool is located beneath the platform 3 and therefore is not visible in the figures. The platform 3 has an opening 102 defined therein through which the tether can pass; one end 101a of the tether 101 projects from the opening 102; this end 101a of the tether can be selectively attached to an aerial vehicle 30 (see FIG. 3). The tether 101 is unwound from the spool as an aerial vehicle 30 which is attached to said end 101a of the tether 101 flies in a direction away from the storage case 1, and the tether 101 is wound onto the spool as an aerial vehicle 30 which is attracted to said end 101a of the tether 101 flies in a direction towards the storage case 1. In the most preferred embodiment the controller 5 is further configured to control the winding and unwinding of the tether from the spool based on a measure of tension in the tether 101.

The controller 5 is preferably configured to move the first and second doors 2a,2b to third position, which is between the first position and second position, after the first and second doors 2a,2b have been moved their respective second position and the aerial vehicle 30 (see FIG. 3) has been launched from the platform 3. Moving the first and second doors 2a,2b to third position, which is between the first position and second position, ensures that the doors 2a,2b provide some protection to the inside of the storage case 1, against adverse environmental conditions (such as rain or snow), while at the same time allowing sufficient opening of the doors 2a,2b to facilitate the tether 101 (i.e. leaving sufficient space between the first and second doors 2a,2b so as to not restrict the movement of the tether 101 and thereby not restrict the flight of the vehicle 30 which is attached to the end 101a of tether 101).

It should be understood that the spool, tether 101 and opening 102 are just optional features of the storage case 1. In a variation of the embodiment the storage case 1 is without a spool, tether or opening; such a variation of the embodiment is preferable when the storage case is to be used with an aerial vehicle which is designed to be mechanical independent when flying (i.e. an aerial vehicle which is not designed to be tethered). In this variation the controller may be configured to move the first and second doors to their to their respective first positions (i.e. to close the doors 2a,2b) after an aerial vehicle has been launched from the platform 3; unlike the embodiment of FIG. 1a, in this variation of the embodiment the doors 2a,2b can be completely closed after the aerial vehicle has been launched as there is no need to leave the doors partially open to facilitate a tether.

Referring to FIG. 1b, which shows a side view of the storage case 1, it can be seen that the storage case 1 further comprises an attachment means 50 which is configured to enable the storage case 1 to be attached to a vehicle (such as an SUV or a fire truck). In the most preferred embodiment, the attachment means 50 is configured to allow the storage case 1 to be attached to a vehicle; and most preferably the attachment means 50 is configured to allow the storage case 1 to be attached to a roof of the vehicle. According to a further aspect of the present invention there is provided a vehicle having the storage case 1 attached to it. It should be understood that in the present application the term 'vehicle' can be any movable object (and preferably is any moveable object which can transport people or goods or any other objects); and includes, but is not limited to, a car, sport utility vehicle (SUV), truck (such as a fire truck), a trailer, boat, train, carriage, a moveable robot etc. In another embodiment the storage case 1 may be attached to a structure which has a fixed location (i.e. is immovable), such as for example, a building or other fixed structure (such as an oil rig for example).

Referring to FIG. 5, which shows an exploded view of the storage case 1 shown in FIG. 3 it can be see that in the preferred embodiment the storage case 1 is modular comprising a frame member 61 and a body member 60 wherein the frame member 61 can be removably attached to body member 60; the platform 3 in turn can be removably attached to the frame member 61. The frame member 61 comprises at least the motor 11, belt 12, controller 5, the actuator modules 13, and preferably a supporting skeleton 63 for mechanical support; the supporting skeleton 63 is preferably composed of robust material such as metal for example. The frame member 61 is contained within a volume defined by the body member 60. The body member 60 may be modular, being composed of a plurality of body parts which fit together to define the body member 60. The body member 60 is preferably composed of plastic or any other suitable material. In the most preferred embodiment the body member 60 is fixed to the vehicle; to service or repair the storage case 1 the body member 60 can remain fixed to the vehicle and the frame member 61 can simply be detached from the body member 60 to allow easier access to the parts of the storage case 1 (such as, in particular, the motor 11, belt 12, controller 5, the actuator modules 13); the frame member 61 is simply reattached to the body member 60 after servicing or repair is complete.

Referring to FIG. 2, it can be seen that the storage case 1 further comprises one or more visual indicators 52; in this example the visual indicators comprise light sources 52 in the form of LED's 52 (however it should be understood that the visual indicators may take any suitable form so long as they are configured to provide a signal which is visible to a user). In the preferred embodiment the controller 5 is configured to operate the LED's to provide a visual indication. For example the controller may be configured to operate the LED's to emit a first colour light when the doors 2a,2b are open; and to emit a second colour light when the doors 2a,2b are closed—thereby providing the user with a visual indication of whether the doors 2a,2b are opened or closed; and/or the controller 5 may be configured to operate the LED's to emit a flashing light as a warning signal when an aerial vehicle has been deployed from the storage case 1, so that people in the vicinity are alerted to the fact that there is an aerial vehicle in operation; such visual indicator improve safety, and are particular useful when the storage case 1 is to be used in certain applications such as emergency application (e.g. on fire truck).

In an embodiment the storage case 1 may further comprises one or more heating elements. The controller 5 may be configured to control the heating elements. For example the storage case 1 may comprise a temperature sensor which is configured to measure temperature; the controller 5 may be configured to receive a temperature measurement from the temperature sensor and to compare the received temperature measurement to a predefined threshold temperature; the controller 5 is configured to turn on the heating elements if the received temperature measurement is equal to, or less than, the predefined threshold temperature. In a preferred embodiment the visual indicators 52 also define the heating elements; in other words the visual indicators 52 are dual purpose, being operable to provide a visual indication and/or being operable to provide heat. For example, the one or more LED's 52 may also define the one or more heating elements; during use when the LED's are turned on they will emit heat; the emitted heat can be used to increase the temperature inside the storage case (and/or increase the temperature in the environment around the storage case 1). It should be understood that the visual indicators 52 may be selectively operable to provide a visual indication and heat simultaneously; or the visual indicators my be operable to provide heat only (i.e. the visual indicators 52 are turned on solely for the purposes of generating heat—and not to provide any visual indication); in one example the visual indicators 52 are operated to emit a light which has a predefined characteristic (e.g. a predefined colour) which provides a visual indication that the visual indicators 52 are turned on for the purposes of generating heat. Heating elements are useful, in particular when the storage case 1 is to be used in cold environments where there is a risk that doors 2a,2b of the storage case 1 may be frozen shut; in such conditions the controller 5 will operate the heating elements to emit heat which will thaw the doors 2a,2b so that they can be opened. Having, dual purpose visual indicators 52 which can be operated to provide a visual indication and/or to provide heat, allows to minimize the number of components in the storage case 1 without compromising functionality.

Referring to FIG. 3 (and/or FIG. 1a) it can be seen that the storage case 1 further comprises one or more fans 40 which can be selectively rotated, so as to circulate air within the storage case 1, so as to reduce the temperature within the storage case. In the embodiment shown in FIGS. 1a and 3 the storage case 1 comprises two fans 40, however it should be understood that any number of fans may be provided. In a preferred embodiment the controller 5 is further configured to control the rotations of the fans 40 so as the control the temperature inside the storage case 1. Most preferably the storage case 1 comprises a temperature sensor which provides the controller 5 with a temperature measurement which represent the temperature inside the storage case 1 (preferably when the doors 2a,2b of the storage case 1 are closed); the controller 5 is configured to receive a temperature measurement from the temperature sensor and to compare the temperature measurements to a predefined temperature threshold; if the temperature measurement is greater than or equal to the predefined temperature threshold then then controller operates the fans 40 so that a flow of air is generated within the storage case 1; the flow of air generated will reduce the temperature within the storage case 1. The controller 5 is preferably configured to rotate the fans 40 at a speed proportional to the amount which the temperature measurement exceeds the predefined temperature threshold. Most preferably the controller 5 is configured to operate the fans 40 to generate a flow of air only if the doors 2a,2b of the storage case 1 are closed (i.e. the doors are in their respective first positions), or are partially closes (e.g. the doors are in a third position which is a position between the first and second positions).

In the most preferred embodiment the controller 5 is further configured to rotate propellers 41 of an aerial vehicle 30 (see FIG. 3) which is parked on the platform 3, when controller 5 receives a temperature measurement from the temperature sensor which is greater than or equal to the predefined temperature threshold; in this way the propellers 41 of the parked aerial vehicle 30 are used to generate a flow of air within the storage case 1 which reduces the temperature within the storage case. The controller 5 is preferably configured to rotate the propellers 41 of the parked aerial vehicle 30 at a speed which is proportional to the amount which the temperature measurement exceeds the predefined temperature threshold. The tether 101 may be used to prevent the aerial vehicle 30 from lifting off the platform 3 or becoming displaced from its parked position on the platform 3 as the propellers 41 are rotated to generate the flow of air. Most preferably the controller 5 is configured to operate the propellers 41 to generate a flow of air only if the doors 2a,2b of the storage case 1 are closed (i.e. the doors are in their respective first positions), or are partially closes (e.g. the doors are in a third position which is a position between the first and second positions). It should be understood that either the fans 40 alone could be used to generate the flow of air, or the propellers 41 alone could be used to generate the flow of air, or a combination of the fans 40 and propellers 41 could be used to generate the flow of air.

As described the controller 5 can be configured to control the operation of the storage case, in particular the controller 5 is configured to control mechanical connection means 10 so that it controls the opening and closing of the doors 2a,2b, and corresponding elevating and dropping of the platform 3; the controller 5 may be further configured to control the aerial vehicle 30 which is supported on the platform 3 (and which is to be deployed from the platform). In other words the same controller 5 may be used to operate the storage case 1 and also control the flight of the aerial vehicle 30. In one embodiment the storage case 1 further comprises a sensor which can provide a measurement which represents the orientation of the storage case 1 with respect to a predefined reference; the controller 5 is configured to receive the measurement from the sensor. The controller 5 is configured to adjust the rotation of the propellers 41 of the aerial vehicle 30, during the launch of the aerial vehicle 30 from the platform 3, so as to compensate for any off-set in the orientation of the storage case 1 from the predefined reference. For example, in an embodiment the predefined reference is a horizontal reference; if the storage case is secured to a roof of a vehicle, and that vehicle is parked on a hill, then storage case will have a titled orientation with respect to the horizontal reference (i.e the storage case will be off-set from a horizontal reference); without modifying the rotation of the propellers 41 of the aerial vehicle 30 then the vehicle would take off in a non-vertical direction from the platform 3; in other words if all the propellers 41 were to spin at the same speed during launch then the vehicle would not launch in a vertical direction due to the titled orientation of the storage case 1 (and thus platform 3). So in an embodiment the controller 5 receives from a sensor a measurement which represents the orientation of the storage case 1, and then adjusts the speed of rotation of the propellers 41 of the aerial vehicle 30 so as to compensate for the titled orientation of the storage case (and platform 3) so that the vehicle will take off in a vertical direction.

In an embodiment the storage case 1 further comprises a backup mechanical closure means, which can be manually operated by a user, to move the doors 2a,2b between their respective first and second positions. This backup mechanical closure means provides the user with a means to manually close or open the doors 2a,2b of the storage case 1 in the event the controller 5 fails.

In an embodiment one or more antennas may be mounted on the doors 2a,2b of the storage case 1. Most preferably the one or more antennas will we mounted on an inner surface of the doors 2a,2b (i.e. a surface which defines an inner volume of the storage case 1 when the doors 2a,2b are closed) so that when the doors 2a,2b are open (i.e. in their second position) the antennas are exposed. In a preferred embodiment the antennae comprises Wifi antennae.

Any embodiments of the storage case 1 described above may be used to implement methods according to the present invention:

In one embodiment the storage case 1 may be used to implement a method of deploying (or launching) an aerial vehicle 30, the method comprising the steps of moving the doors 2a,2b to their second position in which the doors 2a,2b are opened, and simultaneously elevating the platform 3 as doors 2a,2ba are moved to their second position; and then launching the aerial vehicle 30 from the platform 3 while the platform is in its elevated position.

In an embodiment the method further comprises the step of moving the doors 2a,2b to a third position which is between the first position and second position after the aerial vehicle 30 has been launched. In another embodiment the method further comprising the step of moving the doors 2a,2b to their respective first positions (in which the doors 2a,2b are closed) after the aerial vehicle has been launched.

In another embodiment there is provided a method of storing an aerial vehicle 30, using the storage case 1, the method comprising the steps of, if the doors 2a,2b are not already in their second position then moving the doors 2a,2b to their second position in which the doors 2a,2b are opened, and simultaneously elevating the platform 3 as the doors are opened; landing the aerial vehicle on the platform 3 while the platform 3 is in its elevated position; moving the doors 2a,2b to their first position in which the doors 2a,2b are closed, and simultaneously lowering the position of the platform 3 as the doors 2a,2b moved to their first position.

According to a further aspect of the present invention there is provided an assembly comprising any embodiment of the storage case 1 described above, and an aerial vehicle 30 which is parked on the platform 3. FIG. 3 provides a perspective view of such an assembly.

According to a further aspect of the present invention there is provided a vehicle comprising any embodiment of the storage case 1 described above. An aerial vehicle 30 may be parked on the platform 3. It should be understood that the storage case 1 may be directly, or indirectly, attached to any type of vehicle, using any suitable attachment means. In one embodiment there is provided a vehicle wherein the storage case is attached to a roof of the vehicle.

In any of the above-mentioned aspects of the invention the vehicle may be a car, a sport utility vehicle (SUV), a truck, a trailer, a boat, a train, a carriage, and/or a moveable robot. For example, the storage case 1 may be attached to the bed of a pickup truck, or attached to the deck of a boat, or attached to the roof of an SUV or car. In an embodiment the storage case 1 may be mounted on a tray, such as a slidable tray; the slidable tray may be selectively slid from first position wherein the storage case is housed in a housing, and a second position wherein the storage case is outside of the housing at a position. The tray can be moved to the second position to allow an aerial vehicle 30 parked on the platform 3 to be launched. The tray, or slidable tray, may be integral to the vehicle, or may be attached directly, or indirectly, to the vehicle using any suitable attachment means.

According to a further aspect of the present invention there is provided a structure, which has a fixed location, having a storage case 1 according to any of the above-described embodiments, attached thereto. The storage case may be attached directly, or indirectly, to the structure using any suitable attachment means. The structure, may comprise, for example, a building, a platform, or any immovable object.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A storage case, which comprises,
    at least one door which is moveable between a first position in which the at least one door is closed and a second position in which the at least one door is opened;
    a platform, which can support an aerial vehicle;
    a mechanical connection means which is connected between the platform and the at least one door, wherein the mechanical connection means is configured such that as the at least one door is moved from its first position to its second position the platform is simultaneously elevated; and as the at least one door is moved from its second position to its first position the platform is simultaneously lowered; and
    a controller which is configured to control the mechanical connection means, wherein the mechanical connection means comprises:
        a motor;
        a belt; and
        a plurality of actuating modules;
    wherein the belt cooperates with the motor so that the motor, when operated, can move the belt,
    wherein the belt further cooperates with each of the actuating modules so that each of the actuating modules are actuated by movement of the belt,
    wherein each actuating module comprises:
        a pulley which comprises a wheel which can rotate about an axis, wherein the belt further cooperates with each of the actuating modules by abutting the wheel of the pulley of each actuating module, so that movement of the belt in a first direction by the motor will cause the belt to rotate the wheel of the pulley of each actuating module in a first direction about its respective axis, and movement of the belt in a second direction by the motor will cause the belt to rotate the wheel of the pulley of each actuating module in a second direction, which is opposite to the first direction, about its respective axis;
        a lead screw which is attached to the pulley in such a way that rotation of the wheel of the pulley will effect rotation of the lead screw;
        a runner which cooperates with the lead screw, wherein the runner is attached to the platform and wherein the runner is configured so that when the lead screw is rotated in a first direction the runner moves up the lead screw towards the pulley, and when the lead screw is rotated in a second direction which is opposite to the first direction, the runner moves down the lead screw away from the pulley;
        a primary arm member and a secondary arm member, wherein the primary arm member is substantially C-shaped; and
        a link which is, at one end thereof, pivotally attached to the runner, and is, at an opposite end thereof, pivotally attached to the primary arm member,
    wherein the primary arm member is pivotally attached, at a first end thereof, to a fixed member, and is, at a second, opposite end thereof, pivotally attached to the door, and
    wherein the secondary arm member is, at a first end thereof, pivotally attached to said door and is, at a second opposite end thereof, pivotally attached to the fixed member.

2. The storage case according to claim 1, wherein the storage case comprises a first door which opens in a first direction and a second door which opens in a second direction, wherein the second direction is opposite to the first direction.

3. The storage case according to claim 1, wherein the storage case has an attachment means which can be used to secure the storage case to a vehicle, and/or, to a structure which has a fixed location.

4. The storage case according to claim 1, wherein the storage case further comprises a spool and a tether, wherein one end of the tether can be connected to an aerial vehicle, and wherein the tether is unwound from the spool as an aerial vehicle which is attached to said end of the tether flies in a direction away from the storage case, and wherein the tether is wound onto the spool as an aerial vehicle which is attached to said end of the tether flies in a direction towards the storage case.

5. The storage case according to claim 4, wherein the controller is configured to control the winding and unwinding of the tether from the spool based on a measure of tension in the tether.

6. The storage case according to claim 1, wherein the storage case comprises one or more fans which can be selectively rotated, so as to circulate air within the storage case, so as to reduce the temperature within the storage case.

7. The storage case according to claim 6, wherein the controller is configured to cause the one or more fans to rotate when the temperature within the storage case is greater than or equal to a threshold temperature.

8. The storage case according to claim 1, wherein an aerial vehicle which comprises one or more propellers is parked on the platform, and wherein the controller is configured to cause the one or more propellers to rotate when the temperature within the storage case is greater than or equal to a threshold temperature.

9. The storage case according to claim 1, wherein the controller is configured to move the at least one door to a third position which is between the first position and second position after the at least one door has been moved to its second position and an aerial vehicle has been launched from the platform.

10. The storage case according to claim 1, wherein the controller is configured to move the at least one door to its first position after the at least one door has been moved to its second position and an aerial vehicle has been launched from the platform.

11. The storage case according to claim 1, wherein the storage case further comprises a backup mechanical closure means, which can be manually operated by a user, to move the door between its first and second positions.

12. The storage case according to claim 1, wherein the controller is configured to receive a measurement of the orientation of the storage case; and wherein the controller is further configured to modify the rotation of propellers of an aerial vehicle which is parked on the platform, during launch of the vehicle, so as to compensate for the orientation of the storage case so that the vehicle can launch in a predefined direction.

13. The storage case according to claim 1, wherein the storage case comprises a frame member and a body member, wherein the frame member comprises at least the mechanical connection means and the controller, and wherein the body member comprises one or more modular parts; and wherein the frame member is removably attached to the body member.

14. The storage case according to claim 13, wherein the body member is configured such that it can be fixed to a vehicle and/or to a structure which has a fixed location.

15. The storage case according to claim 14, wherein the vehicle is a car, a sport utility vehicle, a truck, a trailer, a boat, a train, a carriage, and/or a moveable robot and wherein the structure which has a fixed location is a building, a platform, or any immovable object.

16. The storage case according to claim 14, wherein the body member is configured such that it can be fixed to a roof of a vehicle.

17. The storage case according to claim 1, wherein the storage case further comprises one or more visual indicators.

18. The storage case according to claim 17, wherein the one or more visual indicators comprise at least one light source.

19. The storage case according to claim 17, wherein the controller is configured to operate the one or more visual indicators to provide a visual indication.

20. The storage case according to claim 1, wherein the storage case further comprises one or more heating elements.

21. The storage case according to claim 16, wherein the storage case further comprises one or more heating elements, wherein the visual indicators are configured to emit heat during operation, and wherein said visual indicators define said one or more heating elements.

22. The storage case according to claim 1, wherein one or more antennas are mounted on the at least one or more doors.

23. The storage case according to claim 22, wherein the one or more antennas are mounted on a surface of the at least one door which defines an inner volume of the storage case when the at least one door are in their first position.

24. The storage case according to claim 1 further comprising
  a torque sensor which is configured to measure torque applied by a motor to the at least one door,
  wherein the torque sensor is operably connected to the controller,
  wherein the controller is configured to receive a torque measurement from the torque sensor and to compare the received torque measurement to a predefined threshold torque value, and
  wherein the controller is further configured to stop the motor if the torque measurement is greater than, or equal, to the predefined threshold torque value.

25. An assembly comprising a storage case according to claim 1, and an aerial vehicle which is parked on the platform.

26. The assembly according to claim 25, wherein the at least one door is configured to abut the aerial vehicle when the at least one door is in its first position, so that the at least one door prevents the aerial vehicle from becoming displaced from its parked position.

27. The assembly according to claim 25, wherein the storage case comprises a spool and a tether, wherein one end of the tether is connected to the aerial vehicle, and wherein the tether is unwound from the spool as the aerial vehicle flies in a direction away from the storage case, and wherein the tether is wound onto the spool as an aerial vehicle flies in a direction towards the storage case.

28. The assembly according to claim 25, wherein the aerial vehicle is unattached to the storage case.

29. A method of deploying an aerial vehicle, using the assembly according to claim 25, the method comprising:
  moving the at least one door to its second position in which the at least one door is opened, and simultaneously elevating the platform as the at least one door is moved from its first position to its second position; and
  launching the aerial vehicle from the platform while the platform is in its elevated position.

30. The method according to claim 29, further comprising the steps of moving the at least one door to a third position which is between the first position and second position after the aerial vehicle has been launched.

31. The method according to claim 30, further comprising the steps of moving the at least one door to its first position in which the at least one door is closed, after the aerial vehicle has been launched.

32. A method of storing an aerial vehicle, using the assembly according to claim 25, the method comprising,
- moving the at least one door to its second position in which the at least one door is opened, and simultaneously elevating the platform as the at least one door is moved to its second position;
- landing the aerial vehicle on the platform while the platform is in its elevated position; and
- moving the at least one door to its first position in which the at least one door is closed, and simultaneously lowering the position of the platform as the at least one door is moved to its first position.

33. A vehicle comprising a storage case according to claim 1.

34. The vehicle according to claim 33, wherein the storage case is attached to a roof of the vehicle.

35. A vehicle comprising an assembly according to claim 25.

36. The vehicle according to claim 35, wherein the storage case is attached to a roof of the vehicle.

37. The vehicle according to claim 33, wherein the vehicle comprises a car, a sport utility vehicle, a truck, a trailer, a boat, a train, a carriage, and/or a moveable robot.

38. A structure, which has a fixed location, having a storage case according to claim 1 attached thereto.

39. The structure according to claim 38, wherein the structure comprises a building, a platform, or any immovable object.

* * * * *